United States Patent [19]

Asmuth

[11] Patent Number: 5,261,093

[45] Date of Patent: Nov. 9, 1993

[54] INTERACTIVE RELATIONAL DATABASE ANALYSIS WITH SUCCESSIVE REFINEMENT STEPS IN SELECTION OF OUPUT DATA FROM UNDERLYING DATABASE

[75] Inventor: Charles A. Asmuth, Princeton, N.J.

[73] Assignee: David Saroff Research Center, Inc., Princeton, N.J.

[21] Appl. No.: 608,943

[22] Filed: Nov. 5, 1990

[51] Int. Cl.[5] .............................................. G06F 15/40
[52] U.S. Cl. ................................. 395/600; 364/282.1; 364/283.4; 364/281.4; 364/DIG. 1
[58] Field of Search .................... 395/12, 600, 148; 364/DIG. 1, DIG. 2

[56] References Cited

U.S. PATENT DOCUMENTS

| | | | |
|---|---|---|---|
| 4,460,975 | 7/1984 | Torkelsen et al. | 395/148 |
| 4,688,195 | 8/1987 | Thompson et al. | 395/12 |
| 4,791,561 | 12/1988 | Huber | 395/600 |

OTHER PUBLICATIONS

Paradox Relational Database User's Guide Borland International, 1985, 1990 Chapter 4.

*Primary Examiner*—Paul V. Kulik
*Assistant Examiner*—Jennifer M. Orzech
*Attorney, Agent, or Firm*—William J. Burke

[57] ABSTRACT

A multi-step method enables a user to extract useful information from a complex relational database without needing to construct elaborate Structured Query Language statements or to become familiar with details of the particular data model involved. In particular, the method generates a table of output data from a relational database having one or more database tables made up of columns of attributes, rows instances, and one or more keys composed of one or more attributes each as elements. In the method, the steps include selecting an attribute from one of the database tables upon which to base an intermediate table, displaying a key of the database table containing the selected attribute, selecting an attribute element of that key for constraint, generating and displaying a list of alternative attribute sets the members of any of which when constrained will constrain the selected attribute element, selecting a set from that list of alternative attribute sets, generating and displaying a list of combinations of values for the selected attribute set, selecting one of the combinations of values from the list of value combinations, generating an intermediate table in accordance with the selected combinations of values from the list of value combinations, and generating the table of output data from the intermediate table. The intermediate table has only keys whose values have not been constrained.

4 Claims, 7 Drawing Sheets

Prior Art

FIG. 2A

RUNS TABLE

| RUN_ID | DATE |
|---|---|
| 1 | 10/1/90 |
| 2 | 10/1/90 |
| 3 | 10/2/90 |

FIG. 2B

RESULTS TABLE

| RUN_ID | RESULT_NAME | RESULT_VALUE |
|---|---|---|
| 1 | ALPHA | 10 |
| 1 | BETA | 20 |
| 1 | GAMMA | 30 |
| 2 | ALPHA | 15 |
| 2 | DELTA | 25 |
| 3 | BETA | 25 |

FIG. 2C

PARAMETERS TABLE

| RUN_ID | PARAMETER_NAME | PARAMETER_VALUE |
|---|---|---|
| 1 | SIGMA | 28.5 |
| 1 | TAU | 12.3 |
| 2 | EPSILON | 48.1 |
| 2 | TAU | 15.0 |
| 3 | RHO | 73.2 |
| 3 | SIGMA | 32.7 |

FIG. 3A

ALPHA_RESULTS TABLE

| RUN_ID | ALPHA_RESULT |
|---|---|
| 1 | 10 |
| 2 | 15 |

FIG. 3B

TAU_PARAMETERS TABLE

| RUN_ID | TAU_PARAMETER |
|---|---|
| 1 | 12.3 |
| 2 | 15.0 |

FIG. 4

OUTPUT TABLE

| RUN_ID | ALPHA_RESULT | TAU_PARAMETER |
|---|---|---|
| 1 | 10 | 12.3 |
| 2 | 15 | 15.0 |

FIG. 5A

RESULTS TABLE

| RUN_ID | STEP | RESULT_NAME | RESULT_VALUE |
|---|---|---|---|
| 1 | 1 | ALPHA | 10 |
| 1 | 1 | BETA | 20 |
| 1 | 1 | GAMMA | 30 |
| 1 | 2 | BETA | 61 |
| 1 | 2 | DELTA | 62 |
| 2 | 1 | DELTA | 25 |
| 2 | 1 | BETA | 71 |
| 2 | 2 | DELTA | 72 |

FIG. 5B

STEPS TABLE

| RUN_ID | STEP | STEP_TIME |
|---|---|---|
| 1 | 1 | 143 |
| 1 | 2 | 232 |
| 2 | 1 | 220 |
| 2 | 2 | 368 |

FIG. 5C

SUB_PROCESS_TERMINATION TABLE

| RUN_ID | SUB_PROCESS_NAME | STEP |
|---|---|---|
| 1 | MIX | 1 |
| 1 | MATCH | 2 |
| 2 | MATCH | 1 |
| 2 | SORT | 2 |

FIG. 6

BETA_RESULT TABLE

| RUN_ID | STEP | BETA_RESULT |
|--------|------|-------------|
| 1 | 1 | 20 |
| 1 | 2 | 61 |
| 2 | 1 | 71 |

INTERACTIVE RELATIONAL DATABASE ANALYSIS WITH SUCCESSIVE REFINEMENT STEPS IN SELECTION OF OUPUT DATA FROM UNDERLYING DATABASE

FIELD OF THE INVENTION

This invention relates generally to the field of computer analysis of complex relational databases and, more particularly, to methods for simplifying the generation of usable tables of output data from such databases.

BACKGROUND OF THE INVENTION

The amount of data that a single engineer or scientist is able to generate is growing quickly both in volume and complexity. Unless such data can be managed and analyzed efficiently, it tends to be of only limited value. One common approach to the management and analysis of large quantities of data has been use of relational databases. A relational database is advantageous in that (1) the technology is mature and well understood, (2) it is readily available in a number of well established commercial products, (3) there is a standard means of access, Structured Query Language (SQL), which is supported by nearly all commercial products and is well known to those skilled in the art, and (4) tabular data with quite complex interrelationships can be systematically organized.

A relational database is a collection of tables along with some means for extracting information from those tables. An individual table is the implementation of an abstraction called a relation. A relation is simply an assertion of a relationship among attributes of something with which the database is concerned. The attributes correspond exactly to columns in the table of the relation. An instance (sometimes called a tuple) of a relation corresponds to a row of the table. For example, a relation may exist between a social security number and a name. Both name and number are attributes of a person. An instance of this relation would be a particular pair of those attributes that do in fact correspond to the same person. This would be reflected by the existence of a row in the corresponding table whose entries would be the number and the name. Conversely, the existence of the row means that those particular values of the attributes of number and name are related in that they pertain to the same person.

A data model is the plan of a database. It specifies the tables that are in the database, the names of those tables, and both the names and the significance of the columns of each table. As stated above, each table constitutes a relation, each column of a table constitutes an attribute, and each row of a column constitutes an instance or tuple. Another important relational database concept is that of the key. A key, briefly defined, is simply a minimal subset of attributes, a choice of values of which uniquely determines an instance of a relation.

Some important problems remain with respect to the use of relational databases. The process of choosing tables and columns in organizing such a database has been studied extensively. By making these organizations conform to various normal forms, the database designer can make certain that the information originally obtained is preserved and that database operations can be reasonably efficient. Unfortunately, use of these normal forms does not necessarily result in a database whose structure is transparently obvious to human eyes. Even when it is well designed, a database containing material with complex interrelationships often requires fairly long and detailed query statements to extract useful information. There is a need for some way to simplify the process, particularly if it can help a user avoid a need to acquire detailed Structured Query Language (SQL) expertise and if it can help a user avoid a need to know all of the details of a particular data model.

SUMMARY OF THE INVENTION

The invention, from at least one important aspect, takes the form of a refinement process which enables the user to extract useful information from a complex relational database without needing to construct elaborate SQL statements or to become familiar with details of the particular data model involved.

From this aspect, the invention is a multi-step method of generating a table of output data from a relational database having one or more database tables comprising of columns of attributes, rows of instances, and one or more keys composed of one or more attributes each as elements. In the method, the steps include selecting an attribute from one of the database tables upon which to base an intermediate table, displaying a key of the database table containing the selected attribute, selecting an attribute element of that key for constraint, generating and displaying a list of alternative attribute sets the members of any of which when constrained will constrain the selected attribute, selecting a set from the list of alternative attribute sets, generating and displaying a list of combinations of values for the selected attribute set, selecting one of the combinations of values from the list of value combinations, generating an intermediate table in accordance with the selected combinations of values from the list of value combinations, and generating the table of output data from the intermediate table. The intermediate table has only keys whose values were unconstrained. As a result, the user has ready access to the information contained in a complex relational database without either a need to construct complex SQL statements or a need to become familiar with details of the individual data model.

From another aspect, the invention may take the form of the method just described, with one or more additional loops beginning with the selection of an attribute element for constraint. From this aspect, after the first attribute has been selected for constraint another is selected, a list of alternative attribute sets the members of any of which when constrained will constrain the selected attribute is generated and displayed, a selection is made from this new list of constraints, a list of combinations of values is generated from this constraint selection, a selection is made of one of the combinations of values from this new list of value combinations, and a new intermediate table is generated in accordance with the selected combinations of values from the new list. This new intermediate table also has only keys whose values have been unconstrained but has one less key than the previously generated intermediate table. Finally, the table of output data is generated from this intermediate table. In accordance with a further aspect of the invention, these additional loops may continue to be generated as long as there are additional attribute elements of the key to select.

The invention may be better understood from the following more detailed explanation of several specific examples, taken in the light of the accompanying drawing and the appended claims.

BRIEF DESCRIPTION OF THE DRAWINGS

FIGS. 2A, 2B, and 2C are input tables illustrating an example of a relational database to which the invention may be applicable;

FIGS. 3A and 3B are intermediate tables illustrating extraction of preliminary information from the relational database in FIGS. 2A, 2B, and 2C;

FIG. 4 is an output table illustrating final data extracted from the tables in FIGS. 3A and 3B; 25 FIGS. 5A, 5B, and 5C are input tables of a relational database illustrating an example of the manner in which the invention operates;

FIG. 6 is an output table illustrating extraction of final data from the relational database in FIGS. 5A, 5B, and 5C in accordance with the invention.

DETAILED DESCRIPTION

Figure 1:
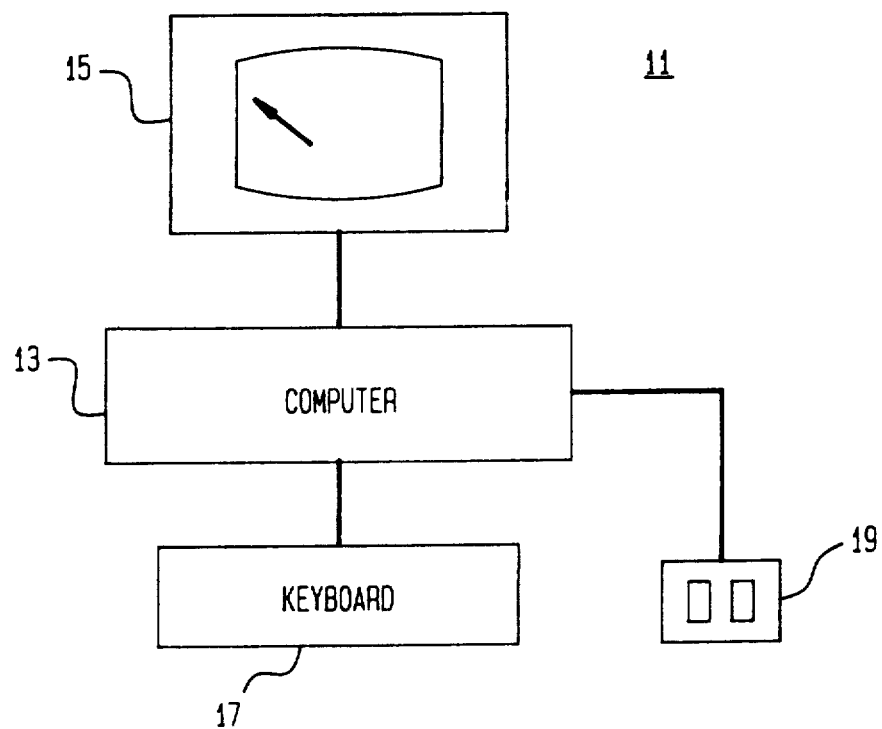
FIG. 1 is a block diagram of a conventional computer assembly of a type to which the invention is readily applicable.

FIG. 1 is a block diagram of a conventional computer assembly 11 of a type to which the invention is readily applicable. In FIG. 1, assembly 11 is made up of a digital computer 13, a video monitor 15, a keyboard 17, and a mouse 19. Keyboard 17 and mouse 19 are both input devices. Mouse 19, when dragged across a work surface (not shown), moves a cursor on the screen of video monitor 15 and includes at least two control buttons. The control buttons on mouse 19 can be clicked to inform computer 83 to selection functions to be performed, to perform such functions, or to make or move visible marks on the screen of monitor 15. "Click," in this sense, is simply the term normally used in the art to mean depressing a mouse button.

Examples of tables making up a simple relational database containing simulation data are shown in FIGS. 2A, 2B, and 2C. The model of such a database may be summarized in the following manner, where runs describes FIG. 2A, results describes FIG. 2B, and parameters describes FIG. 2C:

```
runs: {run_id, date}
    Alternate Key 0 (primary key): {run_id}
results: {run_id, result_name, result_value}
    Alternate Key 0 (primary key): {run_id, result_name}
parameters: {run_id, parameter_name, parameter_value}
    Alternate Key 0 (primary key): {run_id,
parameter_name}
```

In the above description, it can be seen that certain subsets of attributes of each table are listed as making up alternate keys. Usually a particular alternate key is singled out as being a primary key. A primary key of a table may be referred to as its key when there are no other alternate keys and there is no danger of confusion. A combination of values of attributes in a particular alternate key occurring in a table is unique. In the above example, a value of run_id completely determines a value of date in the runs table. Similarly, values of run id and result name jointly determine a value of result value in the results table. In fact, this example is simple enough that each table only has one alternate key, Alternate Key number 0.

For every run of the simulation in the instant example, new entries are made in the database. Each run is uniquely identified with a value of run id. (Thus run id does indeed constitute a key for the table runs.) For each run of the simulation process, the user may choose a variety of kinds of parameters (which are input to the simulation) and values for them. The user may also choose which kinds of output results the simulation is to compute. The kind of parameters set and the kind of results computed vary from run to run of the simulation.

FIG. 2B is an example illustrating how the results table may look. There is an entry for each kind of result computed for each run. An instance of taking data is identified by the value of run id as well as by a value of result name.

The kind of organization of data illustrated is needed for efficiency and flexibility within the database. Queries to such a database, however, can be somewhat complex. Assume, for example, that in the parameters table parameters named sigma and tau have been recorded. Assume, further, that it is desired to compare values of the results of type alpha with parameters of type tau. This can be done with the following SQL query:

```
select results.result_value, parameters.parameter_value
from results, parameters
where
    results.result_name = alpha
and
    parameters.parameter_name = tau
and
    results.run_id = parameters.run_id
```

Thus, it can be seen that even in the very simple case of a three table database, SQL queries begin to get long. In particular, there are three "where" clauses in the query. These are conditions that the data provided by the query must satisfy. The first of these, results.result_name = alpha causes the query to extract only results of type aloha from the results table. The second "where" clause causes the query to extract only parameter values of type tau from the parameters table. The third "where" clause makes certain that values of result value are paired with values of parameter value from the same run. This is a "join" clause and is not the subject of the present invention.

From the user point of view, it would be much better to be able to say "give me alpha results vs. tau settings." The present invention provides just this kind of database access. The terms alpha results and tau settings are examples of identifiers. The identifier alpha results identifies a subset of values in the column result value in the results table (shown in FIG. 2B), namely that particular subset which happens to be of type alpha. Similarly, tau settings identifies a subset of values in the column parameter value in the parameters table (shown in FIG. 2C).

The present invention is a process for refinement in the selection of output data from the underlying relational database. The refinement algorithm is a core algorithm which provides necessary information to carry out the refinement process. The next portion of this specification describes the refinement process in terms of what it does for users. Concepts are developed in terms of the example data model which has been presented. The remainder of the specification follows with a description of what the refinement core algorithm requires in the way of input and what it produces as output, again with examples from the sample data model. Finally, source code for the refinement core algorithm itself is included as an appendix.

At the SQL level, the end result of the refinement process accorded by the present invention is the creation of a temporary table containing the desired subset of values from the original column. An SQL statement creating such a table might be:

```
create table alpha_results(run_id, alpha_result)
    as select run_id, result_value
    from results
    where result_name = alpha
```

The resulting table is shown in FIG. 3A.

The table shown in FIG. 3B, named tau parameters and having the columns run id and tau parameter can be created in a similar fashion. Then, the query to retrieve a comparison of values of alpha result with values of tau parameter would look like this:

```
select
    alpha_results.alpha_result,tau_parameters.tau_parameter
    from alpha_results, tau_parameters
    where alpha_results.run_id = tau_parameters.run_id
```

Note that this time, only the "join" clause was needed since the tables alpha results and tau parameters contain only the desired kinds of data.

Thus, the refinement process can be more explicitly defined as the process of constructing and executing such a "create table" command. The core algorithm that creates this command is one which interacts with the user by giving him or her alternative ways in which to tighten the conditions used to create the temporary table.

Note that in the SQL query defining the table alpha results, the "where" clause is a restriction on the value of an attribute in the key of the table results. As a result, the table alpha results has a key consisting only of the attribute run id. That is, the table specifies for each run of the simulation a value of alpha result.

The refinement process begins with an attribute (such as result value) in an existing table in the database and, through a dialogue with the user, creates a table with a column that contains a subset of the values of the original attribute. All of the other attributes of that table will be keys. Such keys are generally fewer in number than the keys of the original table. The goal of the user is that the resulting table have only those keys whose values may be unconstrained. In the instant example, the user wishes to compare values over a series of simulation runs. Therefore, values of the key run id are not restricted in the creation of the table alpha results.

The following example of refinement uses a slightly more complicated data model, the component tables of which are shown in FIGS. 5A, 5B, and 5C. The assumption now is that the result data taken from the simulation depends not only on run and type but also on which step of the simulation produced the data. Moreover, the simulation process consisted of a number of sub-processes, each of which terminated at a particular step.

```
runs: {run_id date}
    Alternate Key 0 (primary key): {run_id}
check_times: {run_id, step, step_time}
    Alternate Key 0 (primary key): {run_id, step}
    Alternate Key 1: {run_id, step_time}
results: {run_id, step, result_name, result_value}
    Alternate Key 0 (primary key): {run_id, step,
result_name}
    sub_process_termination: {run_id, sub_process_name, step}
        Alternate Key 0 (primary key): {run_id,
sub_process_name}
    parameters: {run_id, parameter_name, parameter_value}
        Alternate Key 0 (primary key): {run_id,
parameter_name}
```

In this model, there is an example of a table with more than one alternate key. Within a given run, there is a sequence of discrete steps, each one completed at a different time. Thus, a value of run id together with a value of step completely determines an entry in the table steps. These two attributes have been chosen as constituting Alternate Key number 0, the primary key. On the other hand, since the steps in a given run occur in a discrete sequence, no two of them are completed at the same time. Thus, a value of run id together with a value of step time also serve to uniquely identify an entry in the table steps. Therefore the pair of attributes run id and step time constitute an alternate key as well and may be designated as Alternate Key number 1.

This more complicated model, with sample date inserted, appears as FIGS. 5A, 5B, and 5C. As before, it is desired to produce an identifier based on the attribute result value. In this case, there are three attributes making up the key to the table results. As before, an identifier is needed whose value is determined uniquely by run id so that it may be used in a query without further qualification. Therefore, the process of refinement places restrictions on the values of both step and result name so that this can be true. Specifically, an identifier called beta match results may be needed, i.e., values of the result of type beta obtained at the end of the match process.

For the key attribute result name there is a very simple situation. No other table has result name as an attribute. Therefore, the only way to say anything about result name is to specify it directly. Assume, for example, that results of type beta are desired. A temporary table beta results may be created with the query:

```
create table beta_results(run_id,step,beta_result)
    as selct run_id,step,result_value
    from results
    where result_name = beta
```

The resulting table is illustrated in FIG. 6.

As one contemplates restricting the value of step, it can be seen that step in fact does occur in other tables of the database. In particular, it occurs in a table where it is not part of at least one key, namely sub process termination. This means that for any given value of run id, the value of step is completely determined by the value of sub process name. If desired, the possible values of sub process name may be requested by the following SQL query:

```
select sub_process_termination.sub_process_name
    from beta_results, sub_process_termination
```

```
        where beta_results.run_id =
sub_process_termination.run_id
        and beta_results.step = sub_process_termination.step
```

The result of this query provides a list of possible values for sub_process_name. After the value "match" has been chosen, the creation of an identifier may be completed with the following query:

```
    create table beta_match_results(run_id,beta_match_result)
    as select beta_results.run_id, beta_results.beta_result
    from beta_results, sub_process_termination
        where beta_results.run_id =
sub_process_termination.run_id
        and beta_results.step = sub_process_termination.step
        and sub_process_termination.sub_process name = match
```

Assume, as before, that the identifier tau parameters has been defined. Then a query to compare values of beta match result with corresponding values of tau parameter is just as simple as before, as shown by the following:

```
select beta_match_results.beta_match_result
    tau_parameters.tau_parameter
from beta_match_results, tau_parameters
where beta_match_results.run_id = tau_parameters.run_id
```

The purpose of the refinement core algorithm, the source code for which is shown in an appendix, is to provide the essential elements of the above queries in such a manner that a user never needs to write them himself.

The refinement core algorithm requires two kinds of input. First there is the information contained in the data model itself. This information includes:

1. The names of the tables.
2. For each table, a list of attribute names.
3. For each table, a list of alternate keys and their members.

Secondly, there is input resulting from user interaction. The refinement core algorithm may be driven by various interface algorithms. The algorithm itself expects the following input:

1. A relation, aRelation, from which the identifier is to be derived.
2. A set of one or more keys, aKeySet of aRelation which the user wishes to constrain.
3. A set of keys, aComplement, of aRelation, which the user explicitly does not wish to constrain.
4. A set of relations, admissibleRelations, which the algorithm will be permitted to try to use to constrain the keys.

The output of the algorithm is a set of refinement methods. Each refinement method represents a separate way in which the members of aKeySet may be directly or indirectly constrained. A refinement method consists of the following:

1. A set of attributes, attributes. These are the attributes of one or more relations in the database which may be constrained in order consequently to constrain a member of aKeySet.
2. A set of "where" clauses, clauses. These are the clauses that are used to construct an SQL statement joining the original relation, aRelation, on which the identifier is based, to the relation some of whose attributes (members of attributes) will be used to constrain the values of the members of aKeySet.
3. A set of relations, relations. These are the relations which are referenced in SQL statements which either report possible values of the members of attributes or which create a new table as a result of a refinement.

Refinement can be practiced in stages. In the example above, the attribute result value is first refined to produce the identifier beta result. beta result is then further refined to produce the identifier beta match result. In the first stage of refinement, the user wishes only to constrain result value. This is very simple since the attribute relation name occurs only in the relation results. If it were always this simple, the refinement algorithm would not really be needed. In this case, the inputs to the refinement algorithm are:

1. aRelation = results. This is the relation in which the attribute result value is found.
2. aKeySet = {result name}. At this point, the user wishes to constrain the value of result name.
3. aComplement = {run id, step}. It is the user's intention to let run id be unconstrained in later queries using the identifier. Also, the user intends to constrain step in a subsequent stage of refinement. Therefore, both are in the complement.
4. admissibleRelations = {all relations other than aRelation}. This parameter is always set in this way in the initial invocation of the algorithm. The algorithm is recursive (it invokes itself) and at each successive self-invocation, the set of admissible relations is shrunk from the previous invocation. This is used to prevent redundancy, infinite recursion, and to speed the algorithm.

The output consists of a single refinement method since the only way to constrain result name is to specify its value directly. The elements of the single refinement method produced by the algorithm are:

1. attributes = {results.result name}
2. clauses = { } (the empty set).
3. relations = {results}.

In a second stage of refinement, it may be desired to constrain the attribute step appearing in the table beta results. In this case, the input to the refinement algorithm is:

1. aRelation = beta results.
2. aKeySet = {step}.
3. aComplement = {run id}. It is still necessary to specify that run id be unconstrained.
4. admissibleRelations = {all relations other than beta results}.

The output consists of three possible refinement methods. They are:

A. The trivial method.
    1. attributes = { beta results.step }.
    2. clauses = { } (the empty set).
    3. relations = { beta results }.
  B. A method using the alternate key of the table check times.
    1. attributes = { check times.step time }.
    2. clauses = { beta results.run id = check times.run id
              beta results.step = check times.step
    }.
    3. relations = { beta results, check times }.
  C. A method using the attribute sub process name from the table sub process termination.
    1. attributes = { sub process termination.sub process name }
    2. clauses = { beta results.run id = sub process termination.run id -continued

```
            beta results.step = sub process
termination.step }.
    3. relations = { beta results. sub process
termination }.
```

Typical source code for implementing the refinement core algorithm is attached hereto as an appendix.

It is to be understood that the embodiments of the invention which have been described are illustrative. Numerous other arrangements and modifications may be readily devised by those skilled in the art without departing from the spirit and scope of the invention.

APPENDIX

```
/* Copyright 1990 David Sarnoff Research Center */

/* All rights reserved */

/*

%M% %I%

Date created %G%

Date used     %H%

*/ static char sccsData[] = "%Z%%M% %I% updated %G%";

/*

DataDictionary.m

*/

/*

$Description: A DataDictionary object contains information about a relational database. Specifically, it maintains a list of all relations.

DataDictionary assumes the ownership of the relations.

It also maintains a list of attributes so that an attribute can be found quickly.  However, DataDictionary does not own the attributes.

Relations own them.

*/
```

```
#import "objc.h"
#import "DataDictionary.h"
#import "String.h"
#import "Sequence.h"
#import "SortCltn.h"
#import "OrdCltn.h"
#import "Set.h"
#import "Sequence.h"
#import "IPSequence.h"
#import "String.h"
#import "Attribute.h"
#import "Relation.h"
#import "Identifier.h"
#import "RefinementMethod.h"
#import "RefinementStep.h"

BOOL meets();
BOOL subset();

@implementation DataDictionary: Object {
    id sortCltnOfRelations;
    id sortCltnOfAttributes;
}

+ new {
    self = [super new];
    sortCltnOfRelations = [SortCltn new];
    sortCltnOfAttributes = [SortCltn new];
    return self;
}

- findAttribute:(STR)attributeName {
    id n, seq;
```

```
  seq = [sortCltnOfAttributes eachElement];
  while(n = [seq next]) {
    if(strcmp([n name],attributeName)==0) return n;
  }
  [seq free];
  return nil;
}

// Add the Attribute anObj to the receiver.
// The receiver assumes the ownership of anObj.
- addAttribute:anObj {
  if(![anObj isKindOf:Attribute]) return nil;
  // make sure no duplicate in name
  if([self findAttribute:[anObj name]]) return nil;
  [sortCltnOfAttributes add:anObj];
  return self;
}

- findOrCreateAttribute:(STR)attributeName {
  id obj;

obj = [self findAttribute:attributeName];
  if(!obj) {
    obj = [Attribute createAttribute:attributeName];
    [self addAttribute:obj];
  }
  return obj;
}

- findRelation:(STR)relationName {
  id n, seq;
```

```
  seq = [sortCltnOfRelations eachElement];
  while(n = [seq next]) {
    if(strcmp([n name],relationName)==0) return n;
  }
  [seq free];
  return nil;
}

// Add the Relation anObj to the receiver.
// The receiver assumes the ownership of anObj.
- addRelation:anObj {
  if(![anObj isKindOf:Relation]) return nil;
  // make sure no duplicate in name
  if([self findRelation:[anObj name]]) return nil;
  [sortCltnOfRelations add:anObj];
  return self;
}

- findOrCreateRelation:(STR)relationName {
  id obj;
  obj = [self findRelation:relationName];
  if(!obj) {
    obj = [Relation createRelation:relationName];
    [self addRelation:obj];
  }
  return obj;
}

// Removes the relation with name relationName from the Data
Dictionary.
// The relation is freed.
- removeRelation:(STR)relationName {
```

```
    id anObj, n, seq;

anObj = [self findRelation:relationName];
    if(anObj) {
      [sortCltnOfRelations remove:anObj];
      [anObj free];

// rebuild the list of attributes
      [sortCltnOfAttributes emptyYourself];
      seq = [sortCltnOfRelations eachElement];
      while(n = [seq next]) {
         [sortCltnOfAttributes addContentsOf:[n
sortCltnOfAttributes]];
      }
      [seq free];
      return self;
    } else return nil;
}

- sortCltnOfAttributes {
    return sortCltnOfAttributes;
}

- sortCltnOfRelations {
    return sortCltnOfRelations;
}

- terminate$ {
    if(sortCltnOfRelations) {
      [sortCltnOfRelations elementsPerform:@selector(free)];
      sortCltnOfRelations = [sortCltnOfRelations free];
    }
```

```
    if(sortCltnOfAttributes) sortCltnOfAttributes =
[sortCltnOfAttributes free];
    return [super terminate$];
}

// displays information about all attributes and relations.
// This method is used for debugging purpose.
- display {
    id set, seq1, n1, seq2, n2, seq3, n3;
    int count;
    set = [self sortCltnOfAttributes];
    seq1 = [set eachElement];
    while(n1 = [seq1 next]) {
        [n1 display];
    }
    [seq1 free];

set = [self sortCltnOfRelations];
    seq1 = [set eachElement];
    while(n1 = [seq1 next]) {
        [n1 display];
    }
    [seq1 free];
    return self;
}

// Returns a set of instances of RefinementMethod.
- showMethodsFor:aKeySet complementedBy:aComplement
    inRelation:aRelation
    usingOnly:admissibleRelations{ id aSequence;
```

```
id anAttribute;

id stepSequence;

id setOfAllRefinementSteps = [Set new];

id disjointSequence;

id setOfSetsOfDisjointSteps;

id returnSet = [Set new];

id admissibleSequence;

id possibleRelations = [Set new];

id possibleSequence;

id currentRelation;

id altKeyCltn;

id anAlternateKey;

int numberOfAltKeys,n;

id altKeyComplement;

id aRefinementStep;

id aRefinementStepSet;

id leftOverKeys;

id leftOverSequence;

id aRefinement;

id aPartialRefinement;

id setOfPartialRefinements;

id collectedRefinements;

id collectedSequence;

id aPartialSequence;

id partialRefinementSequence;

id aPartialMethod;

id aMethod;

id derivedComplement;

id derivedKeySet;

id testSet = [Set new];
```

```
/*
    Check each member of the set of admissible relations to
see if it
    can possibly be used to refine aKeySet. A relation
qualifies if its
    attributes have a non-empty intersection with aKeySet. In
addition,
    every qualifying relation is removed from the set of
admissible
    relations that will be used in recursive calls to this
method.
*/
    admissibleSequence = [Sequence over:admissibleRelations ];
    while(currentRelation = [admissibleSequence next]){
        if(meets(aKeySet,[currentRelation setOfAttributes])){
            [possibleRelations add:currentRelation];
            [admissibleRelations remove:currentRelation];
        }
    }
    [admissibleSequence free];

/*
    For each possible relation (currentRelation), we look at
each
    alternate key to see if it may be used to functionally
determine
    one or more elements of aKeySet. For this to be possible,
there
    must be:

1. A non empty intersection of aKeySet with the
complement of the
``` alternate key (anAlternateKey).

2. aComplement must not meet the complement of the alternate key.

When these conditions are met, an instance of RefinementStep
(aRefinementStep) is created. An instance of RefinementStep records
the subset of aKeySet which is determined, the relation in which
it is determined it, and the alternate key which determines it. Each
instance of RefinementStep is added to the set setOfAllRefinementSteps
as it is created.
*/

```
possibleSequence = [Sequence over:possibleRelations];

while(currentRelation = [possibleSequence next]){
    altKeyCltn = [currentRelation ordCltnOfAlternateKeys];
    numberOfAltKeys = [altKeyCltn size];

for(n = 0; n < numberOfAltKeys; n++){ anAlternateKey = [altKeyCltn at:n];

altKeyComplement =
            [[currentRelation setOfAttributes]
difference:anAlternateKey];
```

```
        if(!meets(aKeySet,altKeyComplement))continue;

if(meets(aComplement,altKeyComplement))continue;

aRefinementStep = [RefinementStep
createWithKeySubset:
            [aKeySet intersection:altKeyComplement]];
        [aRefinementStep relation:currentRelation];
        [aRefinementStep altKeyNumber:n];

/*
        Further refinement should prescribe ways for
determining
        only the values of attributes in the alternate key
that
        are not in aComplement. These attributes make up
derivedKeySet.
        */
        derivedKeySet = [anAlternateKey
difference:aComplement];

/*
        As we go further in recursive refinement, we never
want
        to specify any attributes that have ever been in a
complement.
        Thus derivedComplement is a superset of
aComplement.
        */
        derivedComplement =
            [[aComplement union:anAlternateKey]
                removeContentsOf:derivedKeySet];
```

```
        /*
        Since elements of keySubset can be determined in
currentRelation
        they are removed from the dwindling set of left
over keys
        */
        [leftOverKeys removeContentsOf:[aRefinementStep
keySubset]];
        /*
        Here is the recursive call to this method.
        */
        aPartialRefinement = [self
showMethodsFor:derivedKeySet
                complementedBy:derivedComplement
                inRelation:currentRelation
                usingOnly:admissibleRelations ];

/*
        We need to go through the instances of
RefinementMethod
        just obtained in aPartialRefinement to insert
aRelation
        and clauses linking aRelation to currentRelation.
We then
        add the set of augmented instances of
RefinementMethod
        to the set setOfPartialRefinements.
        */
        aPartialSequence = [Sequence
over:aPartialRefinement];
                while(aPartialMethod = [aPartialSequence next]){
                    [aPartialRefinement remove:aPartialMethod];
```

```
        [aPartialMethod addClausesToLink:aRelation
            to:currentRelation];
        [aPartialMethod addRelation:
            [String str:[aRelation name]] ];
        [aPartialRefinement add:aPartialMethod];
    }
    [setOfPartialRefinements add:aPartialRefinement];

[aPartialSequence free];
    [derivedComplement free];
    [derivedKeySet free];

}

/*
    Given a set of disjoint instances of RefinementStep,
for each
    step, there may be more than one instance of
RefinementMethod
    obtained by the recursive call to this method. We now
produce
    all sets of such instances of RefinementMethod, one
corresponding
    to each instance of RefinementStep. These subsets are
collected
    into the set collectedRefinements.
*/
    partialRefinementSequence = [Sequence
over:setOfPartialRefinements];
    collectedRefinements = [Set new];
``` chooseElements(collectedRefinements,partialRefinementSequence)
;

```
        [partialRefinementSequence free];
        [setOfPartialRefinements freeContents];
        [setOfPartialRefinements free];

/*
        Each set of instances of RefinementMethod found in the
set
        collectedRefinements is consolidated into a single new
instance
        of RefinementMethod. Then the leftover attributes are
added
        to that instance. It is thenm finished and added to
returnSet.
        */
        leftOverSequence = [Sequence over:leftOverKeys];
        collectedSequence = [Sequence
over:collectedRefinements];
        while(aRefinement = [collectedSequence next]){
            /*
            Create and fill consolidated instance of
RefinementMethod.
            */
        ,   aMethod = [RefinementMethod create];
            [aMethod addRelation:[String str:[aRelation
name]]];
            aSequence = [Sequence over:aRefinement];
            while(aPartialMethod = [aSequence next]){
                [aMethod addDataFrom:aPartialMethod];
                [aPartialMethod free];
```

```
        }

/*
        Augment with names of left over attributes.
        */
        while(anAttribute = [leftOverSequence next]){
            [aMethod
                addAttribute:[String sprintf: "%s.%s",
                    [aRelation name],[anAttribute name]]];
            }

[leftOverSequence rewind];
        [returnSet add:aMethod];

}
        [stepSequence free];
        [leftOverSequence free];
        [leftOverKeys free];

}

[possibleRelations free];
        [possibleSequence free];
        [disjointSequence free];
        [[setOfSetsOfDisjointSteps freeContents] free];

/*
        Finally, having included all non-trivial refinement
methods
        in returnSet, we create and add the trivial method, that
is,
        the one which prescribes setting each member of aKeySet
explicitly.
```

```
No clauses are recorded as only aRelation is used.
*/ aMethod = [RefinementMethod create];

[aMethod addRelation:[String str:[aRelation name]]];

aSequence = [Sequence over:aKeySet];

while(anAttribute = [aSequence next]){

[aMethod addAttribute:[String sprintf: "%s.%s",
        [aRelation name],[anAttribute name]]];
}

[returnSet add:aMethod];

[aSequence free];

/*
The returnSet is now complete

*/
    return returnSet;

}

@end chooseElements(setOfChoiceSets,sequenceOfSets)

id setOfChoiceSets;

id sequenceOfSets;

{
    id currentSet = [sequenceOfSets next];

id currentSequence;

id currentElement;

id choiceSequence;

id currentChoice;
```

```
if(!currentSet){
    return;
} currentSequence = [Sequence over:currentSet];

chooseElements(setOfChoiceSets,sequenceOfSets);

if([setOfChoiceSets isEmpty]){ while(currentElement = [currentSequence next]){
        [setOfChoiceSets add:[Set add:currentElement]];
    } return;
} choiceSequence = [Sequence over:setOfChoiceSets];

while(currentChoice = [choiceSequence next]){ while(currentElement = [currentSequence next]){
            [setOfChoiceSets add:[[currentChoice copy]
add:currentElement]];
        }
        [currentSequence rewind];
        [setOfChoiceSets remove:currentChoice];
        [currentChoice free];
    }

[choiceSequence free];
    [currentSequence free];
```

}

```
restrictedPower(powerSet,baseSet)
id powerSet, baseSet;

{
    id baseSequence = [Sequence over:baseSet];
    id firstItem;
    id otherItem;
    id powerSequence;
    id subset;
    id subsetSequence;
    BOOL ok;

if(firstItem = [baseSequence first]){

[baseSet remove:firstItem];
        restrictedPower(powerSet,baseSet);

powerSequence = [Sequence over:powerSet];

while(subset = [powerSequence next]){
            subsetSequence = [Sequence over:subset];
            ok = YES;
            while(otherItem = [subsetSequence next]){
                ok = ok && (!meets([firstItem keySubset],[otherItem keySubset]));
            }
            if(ok) [powerSet add:[[subset copy] add:firstItem]];
            [subsetSequence free];
        }
```

```
        ·[powerSequence free];
    } else{

[powerSet add:[Set new]];
    }

[baseSequence free];

}

BOOL meets(set1,set2)
id set1, set2;
{
    id sequence = [Sequence over:set1];
    id element;

while(element = [sequence next]){
        if([set2 contains:element]){
            [sequence free];
            return YES;
        }
    }
    [sequence free];
    return NO;
}

BOOL subset(set1,set2)
id set1, set2;
{
```

```
    id sequence = [Sequence over:set1];

id element;

while(element = [sequence next]){ if(![set2 contains:element]){

[sequence free];

return NO;

}

}

[sequence free];

return YES;

}
```

Figure 7:
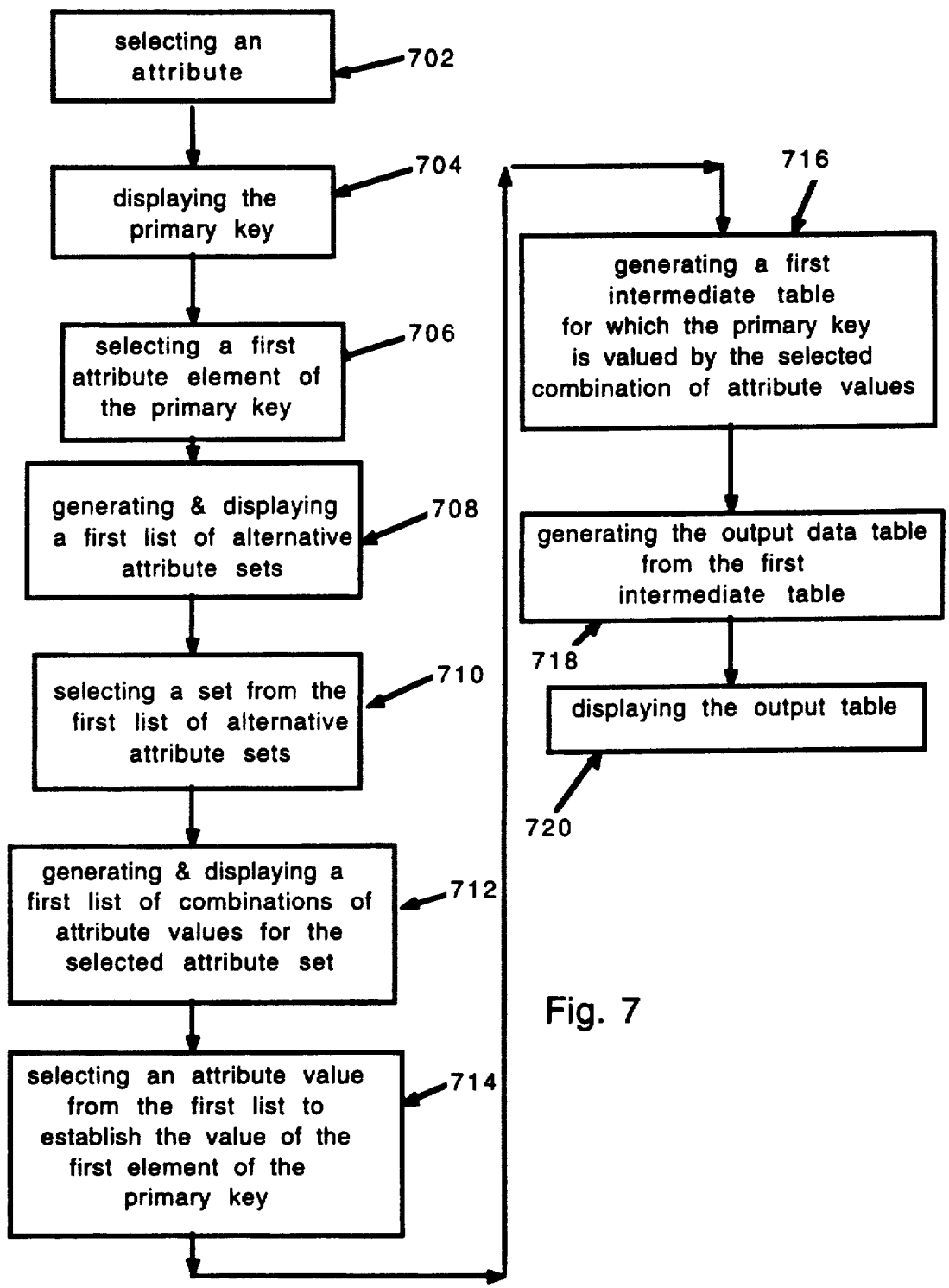
FIGS. 7 and 8 are flow charts illustrating steps of the method of the invention.

A computer based relational database system has at least one database table in computer memory composed of columns of attributes, lines of instances, and a primary key composed of at least one attribute as an element. In FIG. 7, a method of generating a table of output data in computer memory is illustrated as a series of steps in the form of a flow chart. The method comprises the step 702 of selecting an attribute from the database table upon which to base an intermediate table in computer memory, step 704 of displaying on a monitor the primary key of the database table containing the selected attribute, step 706 of selecting a first attribute element of the primary key for constraint, step 708 of generating in computer memory and displaying on the monitor a first list of alternative attribute sets, a first list the members of any of which when constrained will constrain the first selected attribute element, step 710 of selecting a set from the first list of alternative attribute sets, step 712 of generating in computer memory and displaying on the monitor a first list of combinations of attribute values for the selected attribute set, step 714 of selecting one of the combinations of attribute values from the first list of combinations of attribute values so as to establish the value of the first attribute element of the primary key, step 716 of generating in computer memory a first intermediate table comprising those rows of the database table for which the primary key has a value determined by the selected combination of attribute values from the first list of combinations of attribute values in accordance with the selected combinations of attribute values, the first intermediate table having only keys whose attribute values have not been constrained, step 718 of generating in computer memory the output table of data from the first intermediate table, and step 720 of displaying the output table on the monitor.

Figure 8:
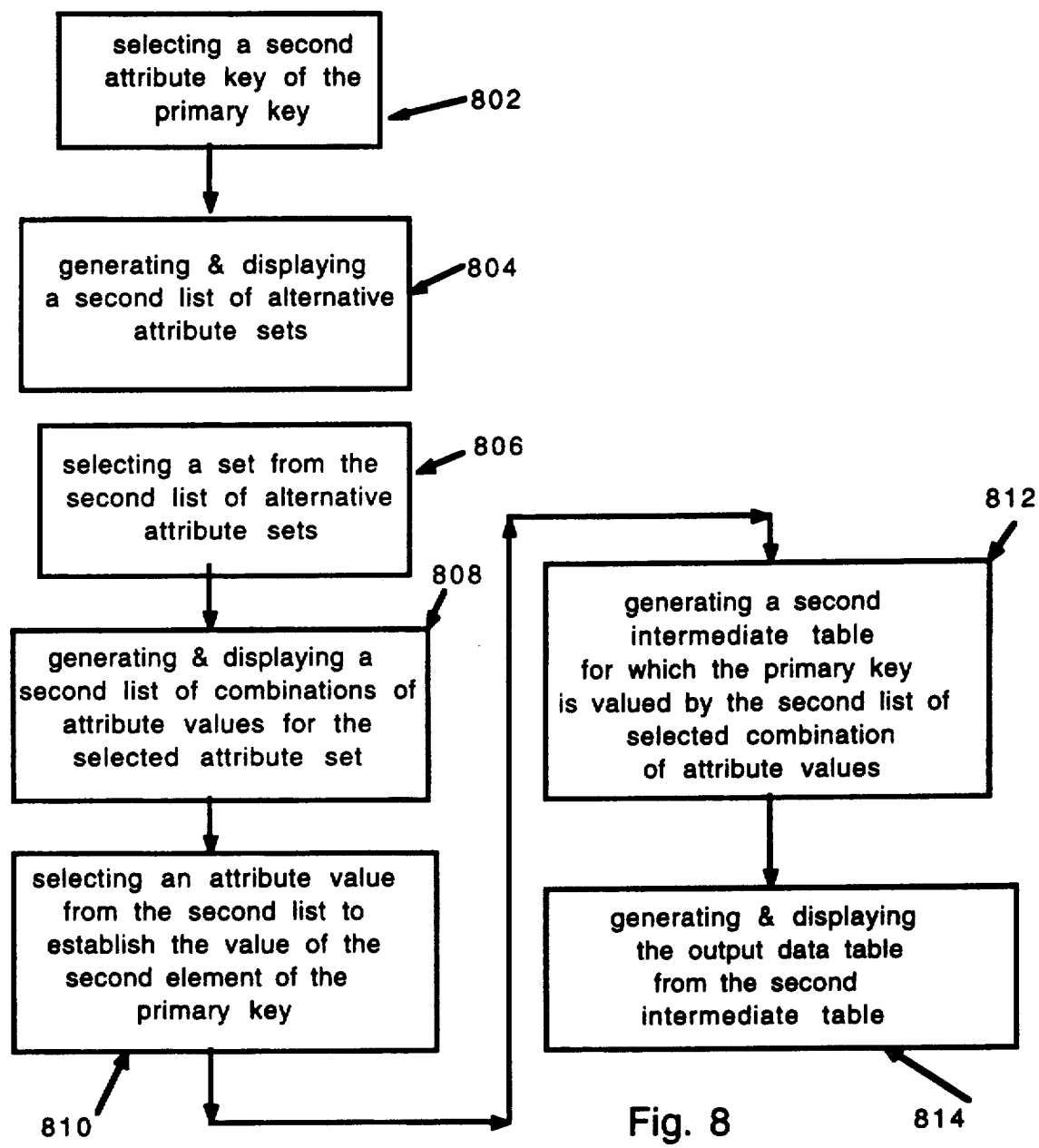

In FIG. 8, the method is further illustrated as a series of additional steps in the form of a flow chart. The method comprises step 802 of selecting a second attribute element of the primary key for constraint, step 804 of generating in computer memory and displaying on the monitor a second list of alternative attribute sets the members of any of which when constrained will constrain the second selected attribute element, step 806 of selecting one set from the second list of alternative attribute sets, step 808 of generating in computer memory and displaying on the monitor a second list of combinations of attribute values for the attribute set selected from the second list of alternative attribute sets, step 810 of selecting one of the combinations of attribute values from the second list of combinations of attribute values so as to establish the value of the second attribute element of the primary key; and step 812 of generating in computer memory a second intermediate table comprising those rows of the first intermediate database table. for which the primary key has a value determined by the selected combination of attribute values from the second list of combinations of attribute values in accordance with the selected combinations of attribute values form the second list of combinations of attribute values, the second intermediate table having only keys whose attribute values have not been constrained; and step 814 in which the output table of data is generated in computer memory from the second intermediate table and displayed on the monitor.

What is claimed is:

1. In a computer based relational database system comprising at least one database table in computer memory composed of columns of attributes, lines of instances, and a primary key composed of at least one attribute as an element, a method of generating a table of output data in computer memory comprising the steps of:

selecting an attribute from said database table upon which to base an intermediate table in computer memory;

displaying on a monitor the primary key of said database table containing said selected attribute;

selecting a first attribute element of said primary key for constraint;

generating in computer memory and displaying on said monitor a first list of alternative attribute sets the members of nay of which when constrained will constrain said first selected attribute element;

selecting a set from said first list of alternative attribute sets;

generating in computer memory and displaying on said monitor a first list of combinations of attribute values for said selected attribute set;

selecting one of said combinations of attribute values from said first list of combinations of attribute values so as to establish the value of the first attribute element of said primary key;

generating in computer memory a first intermediate table comprising those rows of said database table for which said p.imary key has a value determined by the selected combination of attribute values from said first list of combinations of attribute values in accordance with said selected combinations of attribute values, said first intermediate table having only keys whose attribute values have not been constrained; and generating in computer memory said output table of data from said first intermediate table and displaying said output table on said monitor.

2. The method of claim 1 further comprising the steps of:

selecting a second attribute element of said primary key for constraint;

generating in computer memory and displaying on said monitor a second list of alternative attribute sets the members of any of which when constrained will constrain said second selected attribute element;

selecting one set from said second list of alternative attribute sets;

generating in computer memory and displaying on said monitor a second list of combinations of attribute values for said attribute set selected from said second list of alternative attribute sets;

selecting one of said combinations of attribute values from said second list of combinations of attribute values so as to establish the value of the second attribute element of said primary key; and generating in computer memory a second intermediate table comprising those rows of said first intermediate database table for which said primary key has a value determined by the selected combination of attribute values from said second list of combinations of attribute values in accordance with said selected combinations of attribute values from said second list of combinations of attribute values, said second intermediate table having only keys whose attribute values have not been constrained; and in which said output table of data is generated in computer memory from said second intermediate table and displayed on said monitor.

3. In a computer based relational database system comprising a plurality of database tables in computer memory each composed of columns of attributes, lines of instances, and a primary key composed of at least one attribute as an element, the method of generating a table of output data in computer memory comprising the steps of:

selecting an attribute from one of said database tables upon which to base an intermediate table in computer memory;

displaying on a monitor the primary key of the one of said database tables containing said selected attribute;

selecting a first attribute element of said primary key for constraint;

generating in computer memory and displaying on said monitor a first list of alternative attribute sets the members of any of which when constrained will constrain said first selected attribute element;

selecting a set from said first list of alternative attribute sets;

generating in computer memory and displaying on said monitor a first list of combinations of attribute values for said selected attribute set;

selecting one of said combinations of attribute values from said first list of combinations of attribute values so as to establish the value of the first attribute element of said primary key;

generating in computer memory a first intermediate table comprising those rows of said database table for which said primary key has a value determined by the selected combination of attribute values from said first list of combinations of attribute values in accordance with said selected combinations of attribute values from said first list, said first intermediate table having only keys whose attribute values have not been constrained; and generating in computer memory said output table of data from said first intermediate table and displaying said output table on said monitor.

4. The method of claim 3 further comprising the steps of:

selecting a second attribute element of said primary key for constraint;

generating in computer memory and displaying on said monitor a second list of alternative attribute sets the members of any of which when constrained will constrain said second selected attribute element;

selecting one set from said second list of alternative attribute sets;

generating in computer memory and displaying on said monitor a second list of combinations of attribute values for said attribute set selected from said second list of alternative attribute sets;

selecting one of said combinations of attribute values from said second list of combinations of attribute values so as to establish the value of the second attribute element of said primary key; and generating in computer memory a second intermediate table comprising those rows of said first intermediate database table for which said primary key has a value determined by the selected combination of attribute values from said second list of combinations of attribute values in accordance with said selected combinations of attribute values from said second list of combinations of attribute values, said second intermediate table having only keys whose attribute values have not been constrained; and in which said output table of data is generated in computer memory from said second intermediate table and displayed on said monitor.

* * * * *